(12) United States Patent
Yamagata (10) Patent No.: US 7,567,407 B2
(45) Date of Patent: Jul. 28, 2009

(54) STORAGE APPARATUS, IN-VEHICLE NAVIGATION SYSTEM, AND METHOD FOR CONTROLLING TEMPERATURE OF STORAGE APPARATUS (75) Inventor: Toshihiro Yamagata, Ama-gun (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/826,062

(22) Filed: Jul. 12, 2007

(65) Prior Publication Data
US 2008/0030893 A1 Feb. 7, 2008

(30) Foreign Application Priority Data
Aug. 1, 2006 (JP) ............... 2006-210021

(51) Int. Cl.
G11B 33/14 (2006.01)
(52) U.S. Cl. .................................. 360/97.02
(58) Field of Classification Search ........................ None
See application file for complete search history.

(56) References Cited
U.S. PATENT DOCUMENTS

| 5,103,335 A | | 4/1992 | Sugiura |
| 6,546,456 B1 | * | 4/2003 | Smith et al. ............... 711/112 |
| 6,672,767 B2 | | 1/2004 | Hajota et al. |
| 6,735,035 B1 | * | 5/2004 | Smith et al. ............... 360/69 |
| 6,741,420 B2 | | 5/2004 | Jennings et al. |
| 6,975,484 B2 | * | 12/2005 | Herndon et al. ........... 360/99.08 |
| 2006/0139789 A1 | | 6/2006 | Yang |
| 2006/0165323 A1 | | 7/2006 | Son et al. |

FOREIGN PATENT DOCUMENTS

| JP | A-05166291 | 7/1993 |
| JP | A-06-004988 | 1/1994 |
| JP | A-6-074986 | 3/1994 |
| JP | 06150527 A * | 5/1994 |
| JP | A-06-150527 | 5/1994 |
| JP | A-2002-324391 | 11/2002 |

OTHER PUBLICATIONS

Office Action mailed on May 5, 2009 from the Chinese Patent Office in the corresponding Chinese patent application No. 2007101383928 (with English translation).

* cited by examiner

Primary Examiner—K. Wong
(74) Attorney, Agent, or Firm—Posz Law Group, PLC (57) ABSTRACT A storage apparatus includes the following. A storage medium stores information. A drive unit rotatively drives the storage medium. A head section records and/or reproduces information from the storage medium rotatively driven by the drive unit. A detection unit detects temperatures of slide sections during rotative driving. PTC heaters heat the slide sections. A control unit turns on the PTC heaters when a temperature detected by the temperature detection unit is lower than or equal to specified reference temperature.

19 Claims, 8 Drawing Sheets

ELECTRODES

FIG. 9

ELECTRODES

FIG. 10

STORAGE APPARATUS, IN-VEHICLE NAVIGATION SYSTEM, AND METHOD FOR CONTROLLING TEMPERATURE OF STORAGE APPARATUS

CROSS REFERENCE TO RELATED APPLICATION

This application is based on and incorporates herein by reference Japanese Patent Application No. 2006-210021 filed on Aug. 1, 2006.

FIELD OF THE INVENTION

The present invention relates to a storage apparatus and an in-vehicle navigation system having a rotatively driven storage medium such as a hard disk drive (HDD), an optical disk, and a DVD, for example. It further relates to a method for controlling a temperature of the storage apparatus.

BACKGROUND OF THE INVENTION

There is an increasing demand for using a large-capacity HDD as a storage apparatus for an in-vehicle navigation system because detailed map data or audiovisual data are used to increase a data capacity. While vehicles are used worldwide, the in-vehicle navigation system needs to be durable in cold regions. However, it is difficult for an HDD to start at low temperature.

A technology (see Patent Document 1) is proposed to control a heater for warming inside the apparatus before starting the HDD. When an HDD starts unsuccessfully, another technology (see Patent Document 2) is proposed to wait until an operation temperature is reached inside the apparatus due to a thermal loss of HDD operations.

Patent Document 1: JP-2002-324391A
Patent Document 2: JP-1994-74986A

SUMMARY OF THE INVENTION

However, these technologies necessitate a considerably long time to heat the HDD to an operable temperature. The in-vehicle navigation system needs to start immediately after a vehicle engine starts. Even at low temperature, the HDD mounted in the system also needs to start immediately thereafter.

The invention has been made in consideration of the foregoing. It is therefore an object of the invention to provide a storage apparatus and an in-vehicle navigation system capable of quick start at low temperature.

To achieve the above object, according to an aspect of the present invention, a storage apparatus is provided as follows. A storage medium is included for storing data. A drive unit is included for rotatively driving the storage medium. A head unit is included for recording data to the driven storage medium and reproducing the recorded data. A detection unit is included for detecting a temperature in a slide section, which slides while the storage medium is rotatively driven. A control unit is included for turning on a PTC (Positive Temperature Coefficient) heater to heat the slide section when the detected temperature is lower than or equal to a specified reference temperature.

According to another aspect of the present invention, an in-vehicle navigation system is provided to include the above storage apparatus of the first aspect.

According to yet another aspect of the present invention, a method for controlling a temperature a storage apparatus is provided by comprising: rotatively driving the storage medium; detecting a temperature in a slide section while the storage medium is rotatively driven; performing a determination as to whether or not the detected temperature is lower than or equal to a specified reference temperature; and turning on a PTC (Positive Temperature Coefficient) heater to heat the slide section when the determination is affirmed.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

1. First Embodiment a) With reference to FIG. 1, the following describes the construction and basic operations of an in-vehicle navigation system using a storage apparatus according to a first embodiment.

Figure 1:
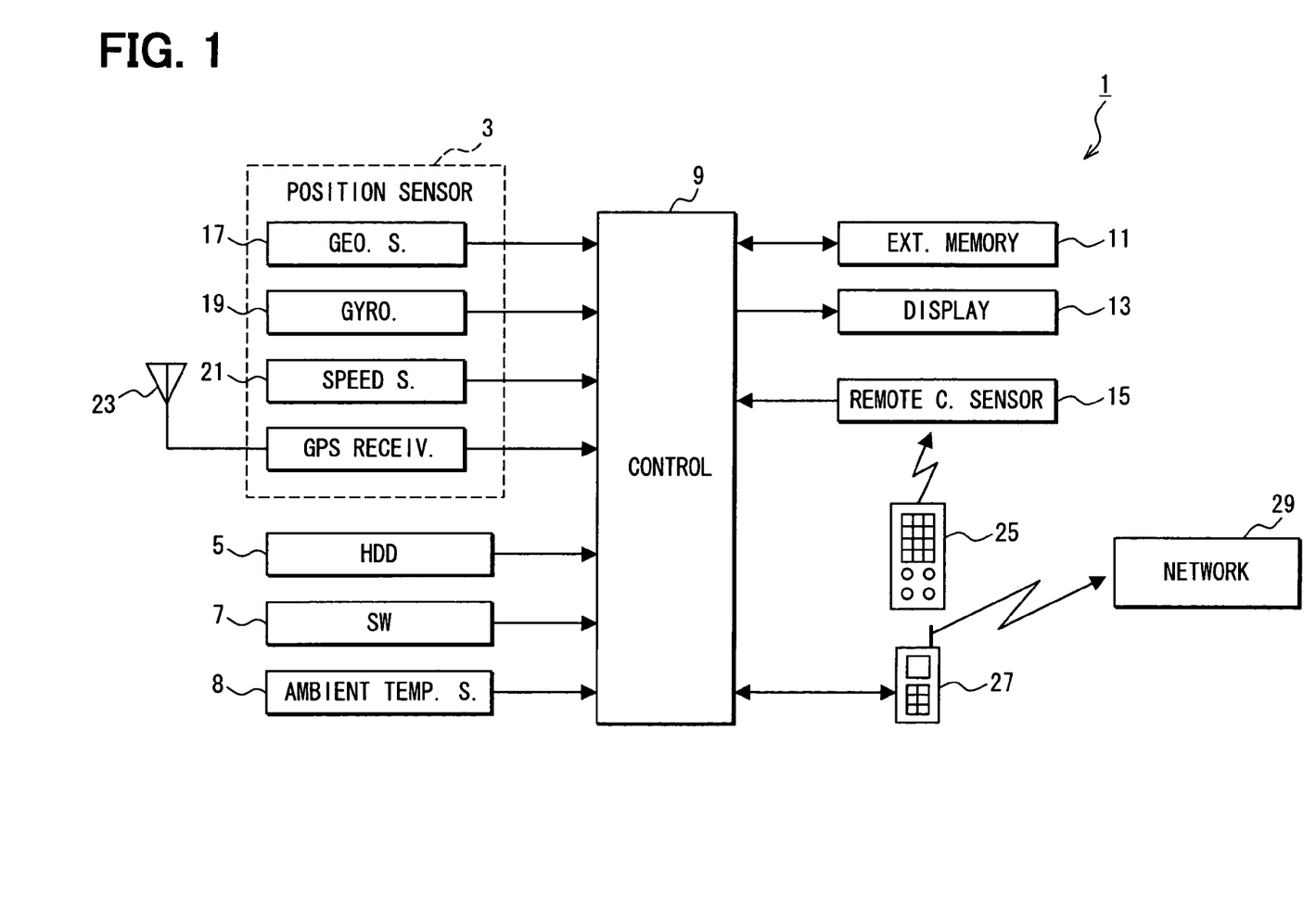
FIG. 1 is a block diagram showing a construction of an in-vehicle navigation system according to an embodiment.

An in-vehicle navigation system 1 includes: a position sensor 3; a hard disk drive (HDD) for recording and reproducing map data and the like; an operation switch group 7; an ambient temperature sensor 8; a control circuit 9 connected to these; external memory connected to the control circuit 9; a display apparatus 13; and a remote control sensor 15. The control circuit 9 is constructed as an ordinary computer. The control circuit 9 contains a known CPU, ROM, RAM, I/O, and a bus line (not shown) connecting these components with each other.

The position sensor 3 includes known components such as: a geomagnetic sensor 17; a gyroscope 19; a distance sensor (vehicle speed sensor) 21; and a GPS receiver 23 for a global positioning system (GPS) that detects a vehicle's position based on a radio wave from a satellite. Each of the sensors and the like 17, 19, 21, and 23 contains a differently characterized error. The multiple sensors are used to complement each other. Depending on accuracies, part of the above-mentioned components may be used. Further, though not shown, it may be preferable to use a revolution sensor for a steering wheel, vehicle speed sensors for rolling wheels, and the like.

The HDD 5 is a storage apparatus for storing various data including not only map data but also map matching data and marking data for improving the position detection accuracy.

The display apparatus 13 is a color display apparatus. A screen of the display apparatus 13 can display a map data based on map data supplied from the HDD 5 and superimpose a vehicle's current position mark supplied from the position sensor 3 and additional data such as a guide route on the map.

The in-vehicle navigation system 1 is provided with a so-called route guidance function. The function automatically selects an optimum route from the current position to a destination, and generates and displays a guide route. A destination position can be input from the remote control sensor 15 using a remote control terminal (hereafter referred to as a remote controller) 25 or from the operation switch group 7. The Dijkstra algorithm is a well-known technique of automatically settling an optimum route. The operation switch group 7 includes a touch switch or a mechanical switch integrated with the display apparatus 13 and is used for entering various commands.

The in-vehicle navigation system 1 can be connected with an external network 29 using a mobile communication device such as a mobile phone 27. The system can connect to the Internet or a special information center.

The ambient temperature sensor 8 measures a temperature outside the vehicle and outputs a corresponding signal to the control circuit 9.

Figure 2:
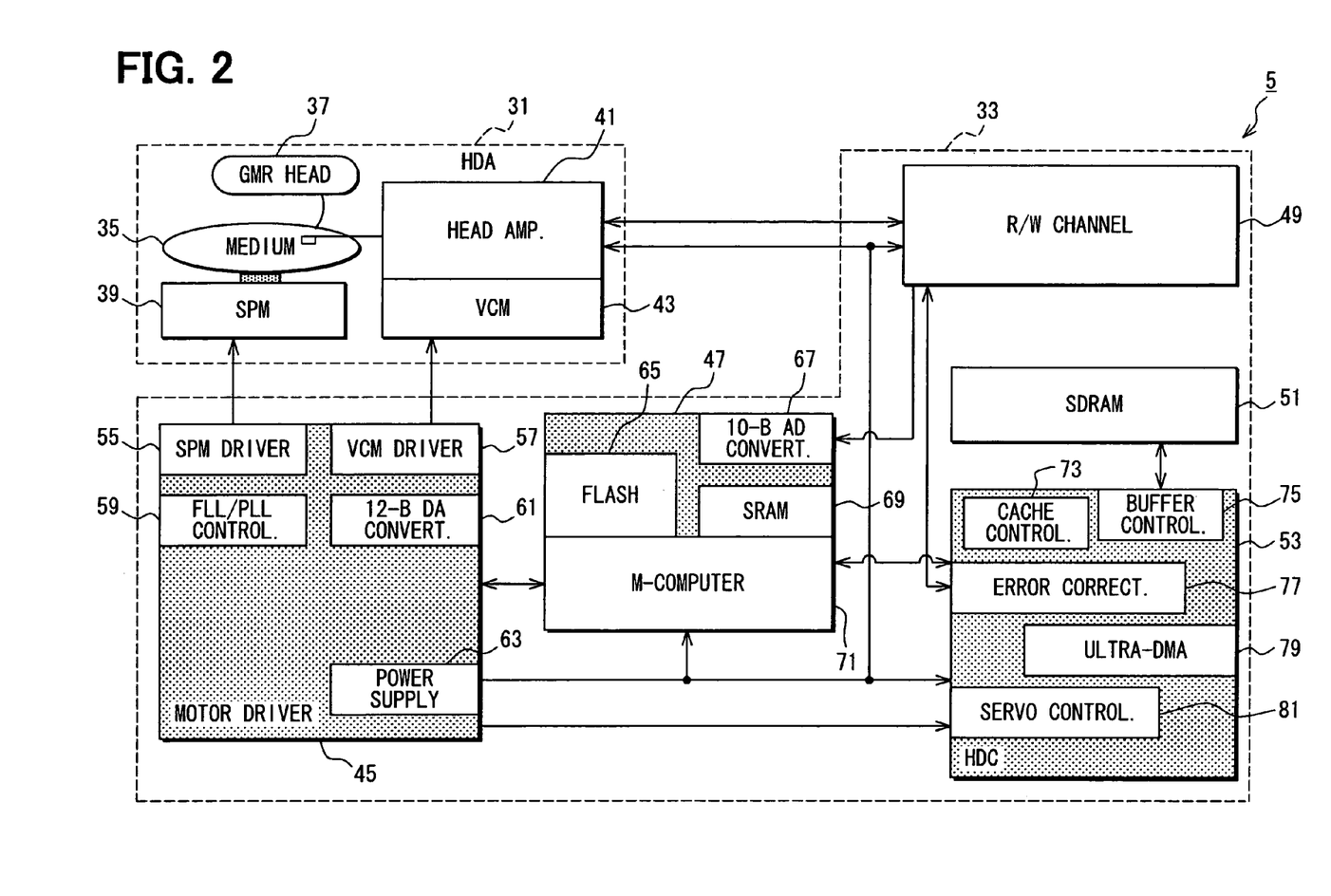
FIG. 2 is a block diagram showing an electric construction of an HDD (Hard Disk Drive)
Figure 3:
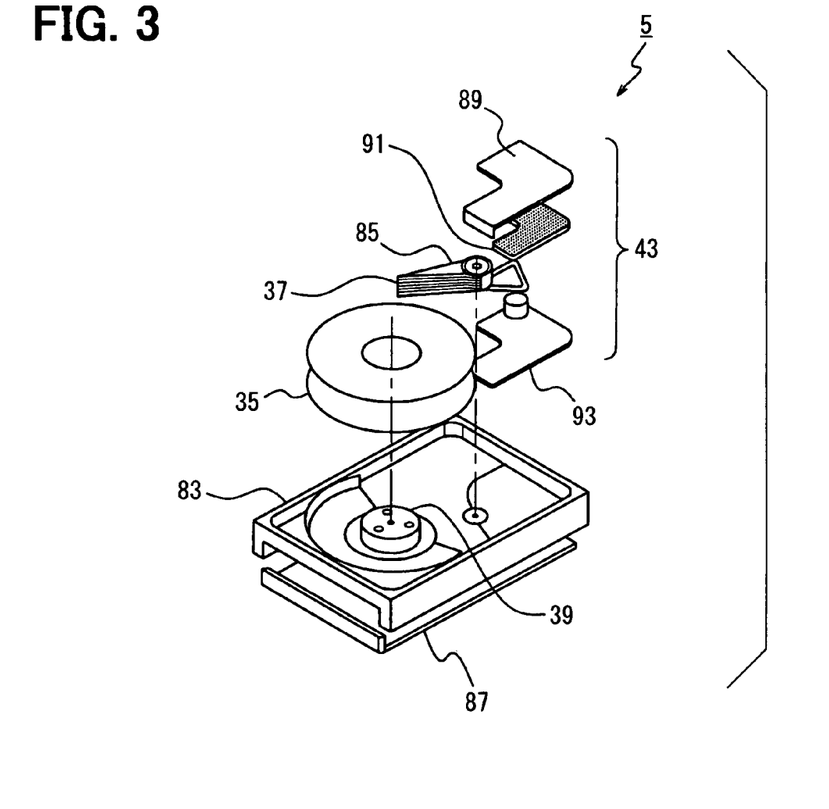
FIG. 3 is a perspective view showing a construction of the HDD.
Figure 4:
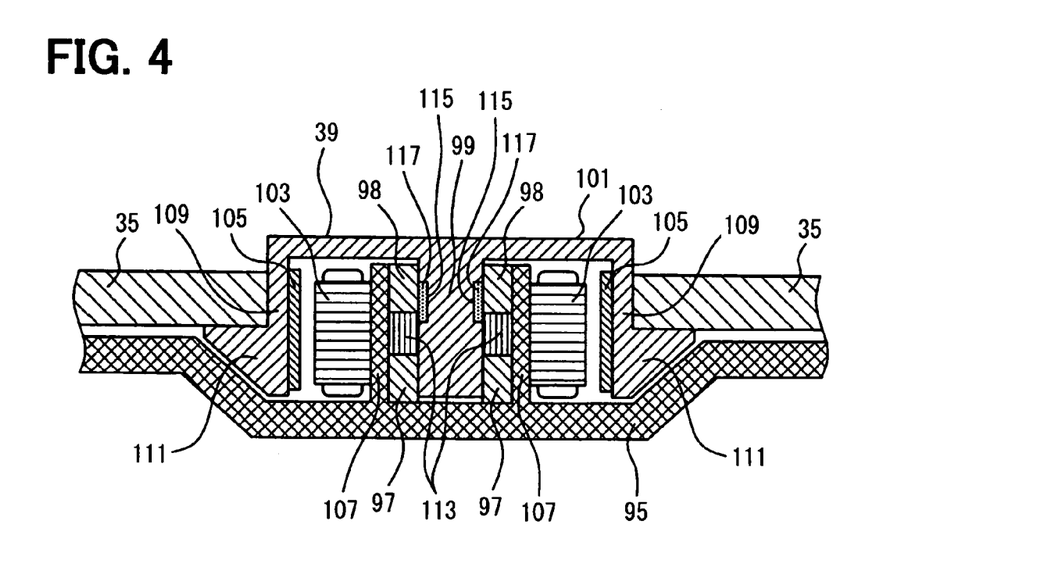
FIG. 4 is a sectional side elevation view showing a construction of an SPM (SPindle Motor)

The following describes the construction of the HDD 5 with reference to FIGS. 2 through 4.

FIG. 2 shows the electric construction of the HDD 5. The HDD 5 includes a head disk assembly (HDA) 31 and a signal processing board 33. The HDA 31 includes a medium 35, a GMR (Giant Magneto-Resistive) head 37, a spindle motor (SPM) 39 for rotating the medium 35, a head amplifier 41, and a voice coil motor (VCM) 43.

The signal processing board 33 includes a motor driver 45, a microcomputer section 47, a read/write channel 49, SDRAM 51, and a head disk controller (HDC) 53. The motor driver 45 includes an SPM driver 55, a VCM driver 57, an FLL&PLL controller 59, a 12-bit DA converter 61, and a power supply circuit 63. The microcomputer section 47 includes flash ROM 65, a 10-bit AD converter 67, SRAM 69, and a microcomputer (control section) 71. The microcomputer 71 includes a 16-bit CPU, a timer, an SIO, and an interrupt controller (not shown). The HDC 53 includes a cache controller 73, a buffer controller 75, an error correction circuit 77, an UltraDMA 79, and a servo controller 81.

FIG. 3 is an exploded view showing the mechanical structure of the HDD 5. The HDD 5 includes a base 83 mounted with the SPM 39 and is sealed with a top cover (not shown). The base 83 is mounted with a head stack assembly including multiple GMR heads 37, the medium 35, the voice coil motor (VCM) 43, a circuit substrate 87, a preamplifier (not shown), a ramp (not shown), and a latch mechanism (not shown). The VCM 43 includes a top yoke 89, a magnet 91, and a bottom yoke 93. The base 83 and the SPM 39 may be integrated with each other.

The structure of the SPM 39 and its vicinity will be described in more detail with reference to FIG. 4. The SPM 39 includes a motor base 95, bearings 97 and 98, a PTC heater (Positive Temperature Coefficient heater) 113, a rotation axis 99, a PTC heater 117, a hub 101, a stator 103, and a magnet 105.

The motor base 95 is a plate-like member whose center is recessed. A cylindrical raised portion 107 is provided at the center of the recess. The bearing 97, the PTC 113, and the bearing 98 are cylindrical members having the same inside and outside diameters. The members are inserted or supported inside the raised portion 107 as a support member so that their main axis direction matches that of the raised portion 107 (a vertical direction in FIG. 4). The bearings 97 and 98 sandwich the PTC heater 113 to determine its vertical position. Bearing grease (not shown) is filled in the bearings 97 and 98.

The rotation axis 99 is inserted inside the bearings 97 and 98 and the PTC heater 113 and contacts the PTC heater 113. A cutout 115 having a constant width is formed on an outside peripheral surface of the rotation axis 99 along a circumferential direction. The band-shaped PTC heater 117 is wound around the cutout 115. The PTC heater 117 contacts the bearing 98. The depth of the cutout 115 equals the thickness of the PTC heater 117. Mounting the PTC heater 117 causes no protrusion or dent on the outside peripheral surface of the rotation axis 99. The PTC heaters 113 and 117 are connected to electrodes through conductors (not shown). The control circuit 9 (see FIG. 1) controls power-on/off of the PTC heaters 113 and 117.

The stator 103 is attached to an outside periphery of the raised portion 107. The hub 101 is attached to the top of the rotation axis 99. The magnet 105 is attached to an inside periphery of an outer edge 109 of the hub 101 so as to be opposite to the stator 103 with a specified gap.

Figure 5:
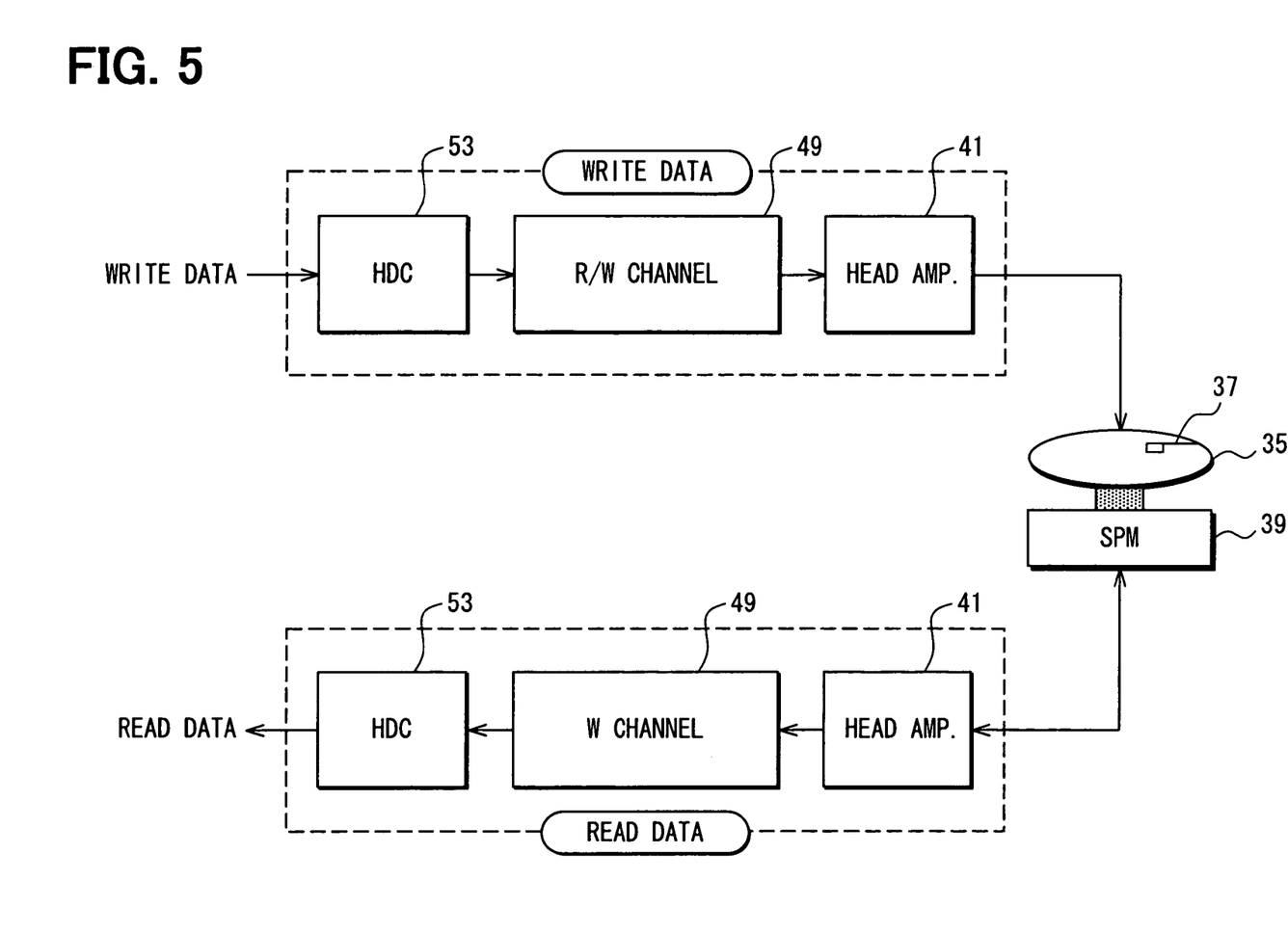
FIG. 5 is an explanatory diagram showing an read/write operation of the HDD.

A protrusion 111 is formed on an outside peripheral surface of the hub 101 at the outer edge 109. When the medium 35 is placed so that the hub 101 is inserted into a center hole of the medium 35, the protrusion 111 contacts the bottom surface of the medium 35 to support it.

c) The following describes a read/write operation of the HDD 5 with reference to FIG. 5. The HDD 5 records data transmitted from the control circuit 9 on the medium 35 as follows. The control circuit 9 transmits write data to the HDD 5. The write data is supplied with an error correction code (ECC) in the HDC 53 and is transferred to the read/write channel 49. A modulation circuit (encoder) in the read/write channel 49 converts the data into a data string so as to further decrease an error rate. The converted data is input to the head amplifier 41. The GMR head 37 records the data on the medium 35.

A signal is reproduced from the medium and is transferred to the control circuit 9 as follows. When the GMR head 37 reads a reproduction signal, it is amplified in the head amplifier 41 and is input to the read/write channel 49. The read/write channel 49 equalizes the input analog signal to an intended waveform. The signal is supplied to a Viterbi decoder, i.e., a type of error correction circuit, and is demodulated in a demodulation circuit. The demodulated data is input to the HDC 53. The HDC 53 performs an error correction process on the data and transfers it to a host system. The error correction process performed by the HDC 53 is called an on-the-fly ECC that features a short delay time.

d) When the in-vehicle navigation system 1 starts, the control circuit 9 performs a control process for starting the HDD 5. This process will be described with reference to a flowchart in FIG. 6.

Figure 6:
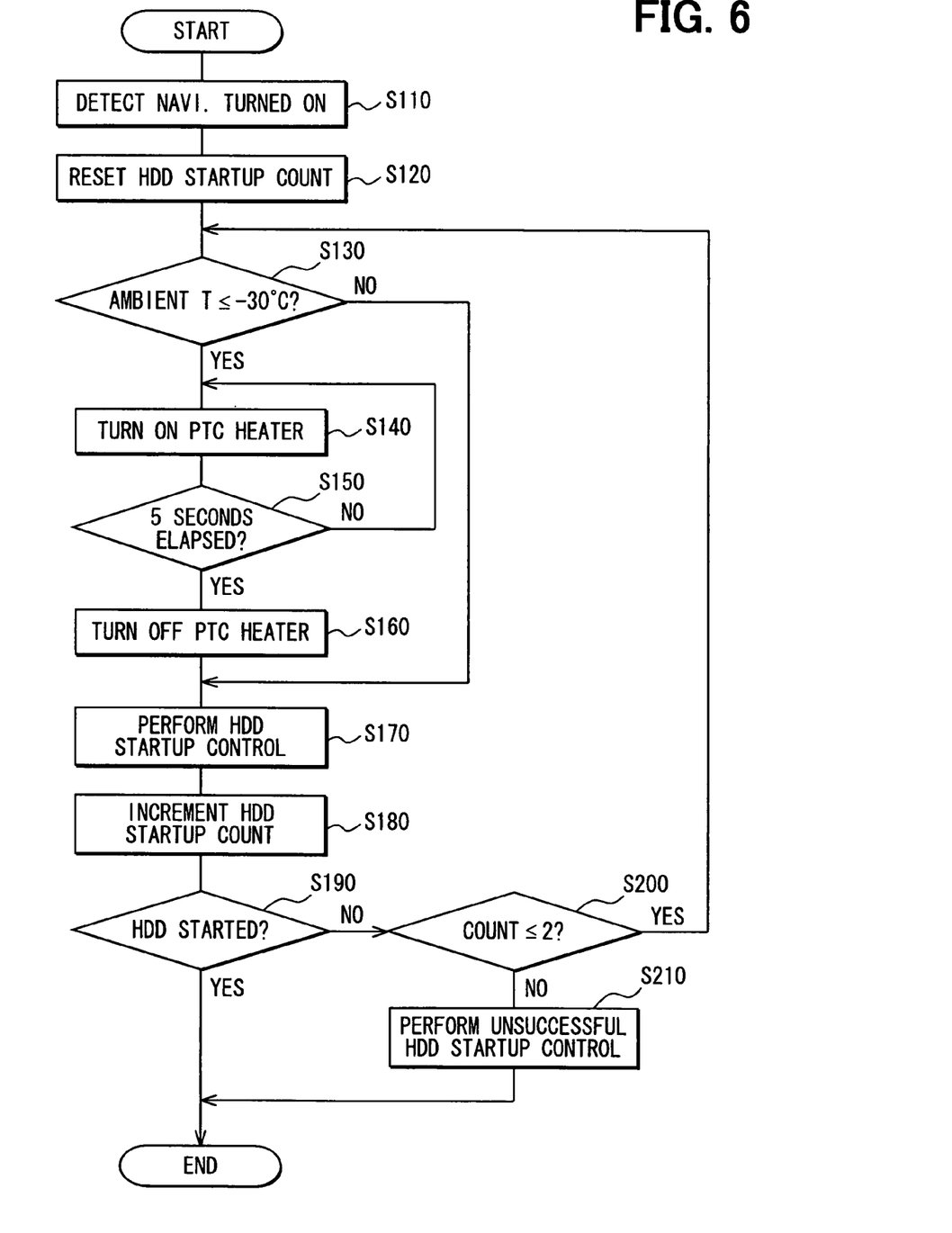
FIG. 6 is a flowchart showing a control process performed by a control circuit when the in-vehicle navigation system starts.

At Step 110, the process detects that the in-vehicle navigation system 1 is powered on.

At Step 120, the process resets a HDD startup count to zero.

At Step 130, the process determines whether or not an ambient temperature acquired from the ambient temperature sensor 8 is lower than or equal to −30° C. (reference temperature T1). A temperature of −30° C. hardens the bearing grease in the bearings 97 and 98 of the HDD 5 and hinders the bearings 97 and 98 from rotating smoothly. When the ambient temperature is lower than or equal to −30° C., the process proceeds to Step 140. When the ambient temperature exceeds −30° C., the process proceeds to Step 170.

At Step 140, the process turns on the PTC heaters 113 and 117.

At Step 150, the process determines whether or not five seconds have passed after the PTC heaters 113 and 117 are turned on at Step 140. When the determination at Step 150 results in YES, the process proceeds to Step 160. When the determination at Step results in NO, the process returns to Step 140.

At Step 160, the process turns off the PTC heaters 113 and 117.

At Step 170, the process performs HDD startup control. This startup control is normally performed for the HDD 5 including revolution of the SPM 39.

At Step 180, the process increments the HDD startup count by 1.

At Step 190, the process determines whether or not the HDD 5 has started. When the determination at Step 190 results in YES, the process terminates. When the determination at Step 190 results in NO, the process proceeds to Step 200.

At Step 200, the process determines whether or not the HDD startup count is smaller than or equal to 2. When the determination at Step 200 results in YES, the process proceeds to Step 130. When the determination at Step 200 results in NO, the process proceeds to Step 210.

At Step 210, the process performs unsuccessful HDD startup control. Specifically, the process displays a caution for a user or adds information to a diagnosis history.

e) The following describes effects provided by the in-vehicle navigation system 1 according to the first embodiment.

(i) The ambient temperature sensor 8 detects an ambient temperature. When the ambient temperature is lower than or equal to −30° C. (reference temperature T1), the HDD 5 turns on the PTC heaters 113 and 117 to heat a slide section, which includes (i) the rotation axis 99, (ii) the bearings 97 and 98, and (iii) a circumference of the rotation axis 99 and the bearings 97 and 98. Even when the HDD 5 initially starts under an ambient temperature of −30° C. or lower, the PTC heaters 113 and 117 heat the slide section (especially the grease used inside the bearings 97 and 98) to decrease a slide resistance. The HDD 5 can thereby start smooth.

The PTC heaters 113 and 117 are characterized by self-temperature controllability of heating with a high power at a low temperature and automatically lowering the power at an increased temperature. The PTC heaters 113 and 117 further feature a thin profile and a small heat quantity and excel in "quick heat" of increasing a temperature immediately after starting using the heaters. The HDD 5 can increase the temperature of the slide section in a very short time period after power-on of the in-vehicle navigation system 1 and can start smooth.

(ii) The PTC heaters 113 and 117 are characterized to partially heat only a low-temperature portion. These heaters consume a very small power compared to a conventional heater that heats an entire portion when the temperature decreases locally. Accordingly, the HDD 5 can also consume a very small power.

(iii) The PTC heaters 113 and 117 cause a small temperature variation and excel in "uniformity" of the temperature. The heaters can uniformly heat the slide section without heating it too much or little.

2. Second Embodiment a) The construction of the in-vehicle navigation system 1 according to the second embodiment is basically the same as the first embodiment but partially differs in the construction of the SPM 39 provided for the HDD 5. The construction of the SPM 39 will be described with reference to FIGS. 7 through 9.

Figure 7:
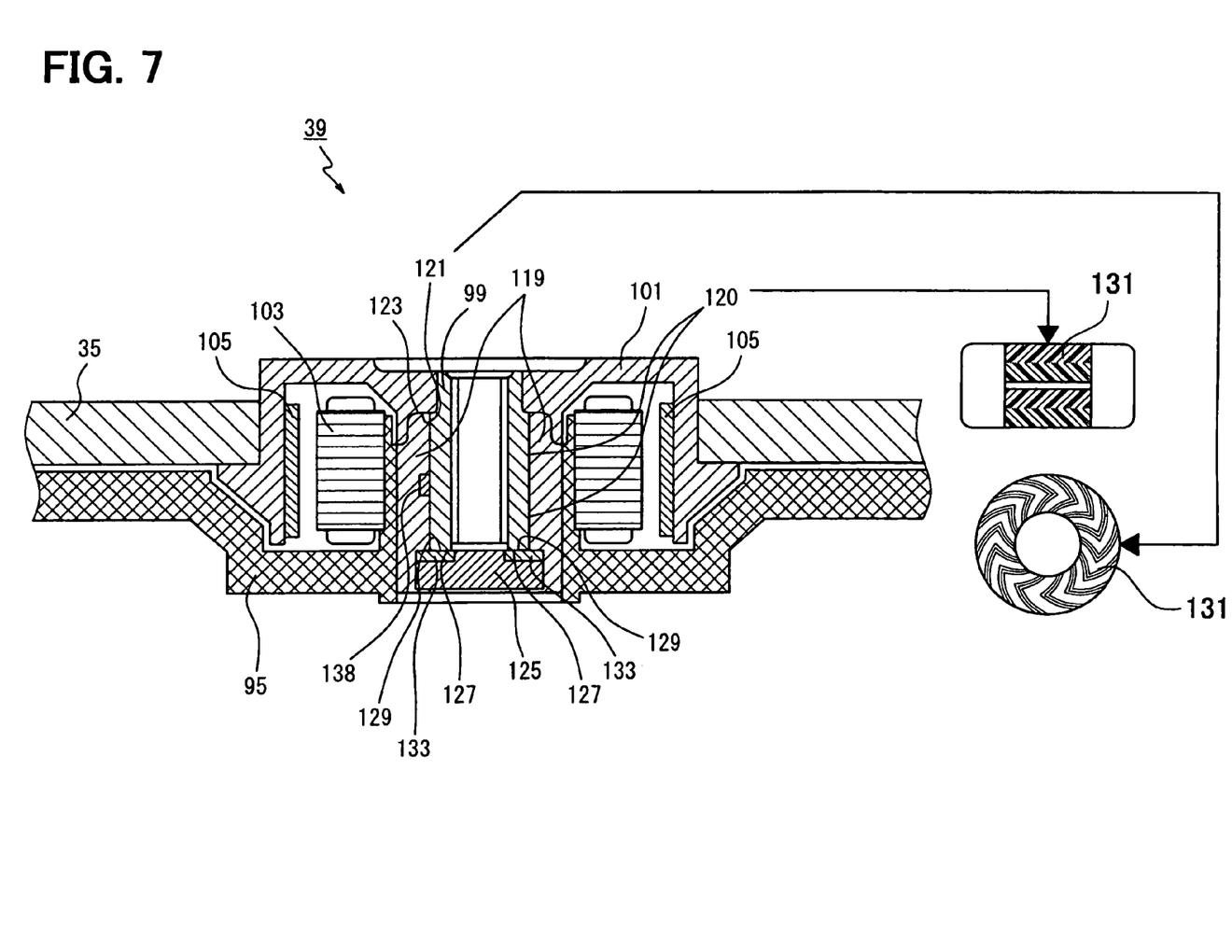
FIG. 7 is another sectional side elevation view showing the construction of the SPM.

As shown in FIG. 7, the SPM 39 according to the second embodiment includes the rotation axis 99 that is inserted into a bearing hole 120 of a sleeve 119 as a support member, not into the bearing, so as to be rotatively supported. The hub 101 is attached around the top of the rotation axis 99. A bottom surface 121 of the hub 101 faces a top surface of the sleeve 119. The rotation axis 99 has a bottom stopper 125 whose top surface 127 faces a bottom surface 129 of the sleeve 119. When the rotation axis 99, the hub 101, and a stopper 125 rotate integratively, an outside peripheral surface of the rotation axis 99 slides on an inside surface of the bearing hole 120 of the sleeve 119. The bottom surface 121 of the hub 101 slides on a top surface 123 of the sleeve 119. A top surface 127 of the stopper 125 slides on the bottom surface 129 of the sleeve 119. These slide surfaces provide hydrodynamic bearings as shown in FIG. 7. In other words, a herringbone groove structure 131 is formed on the inside surface of the bearing hole 120, the bottom surface 121 of the hub 101, and the top surface 127 of the stopper 125, while oil, as one type of fluid for lubrication, is filled between the slide surfaces. The rotation axis 99, the hub 101, and the stopper 125 rotate to generate a dynamic pressure, supporting the rotation axis 99 and the like floated with the oil.

Figure 8:
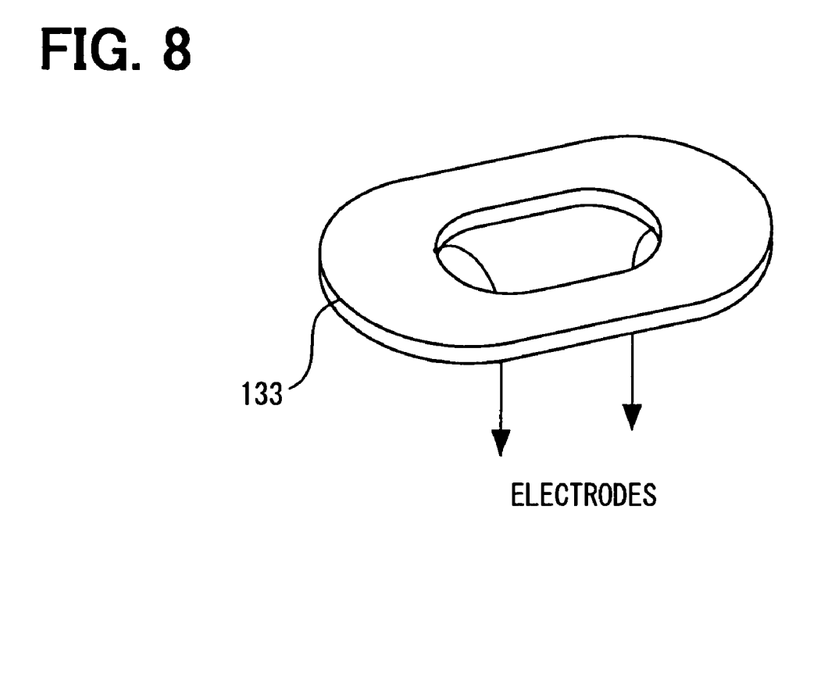
FIG. 8 is a perspective view showing a construction of a PTC (Positive Temperature Coefficient) heater.
Figure 9:
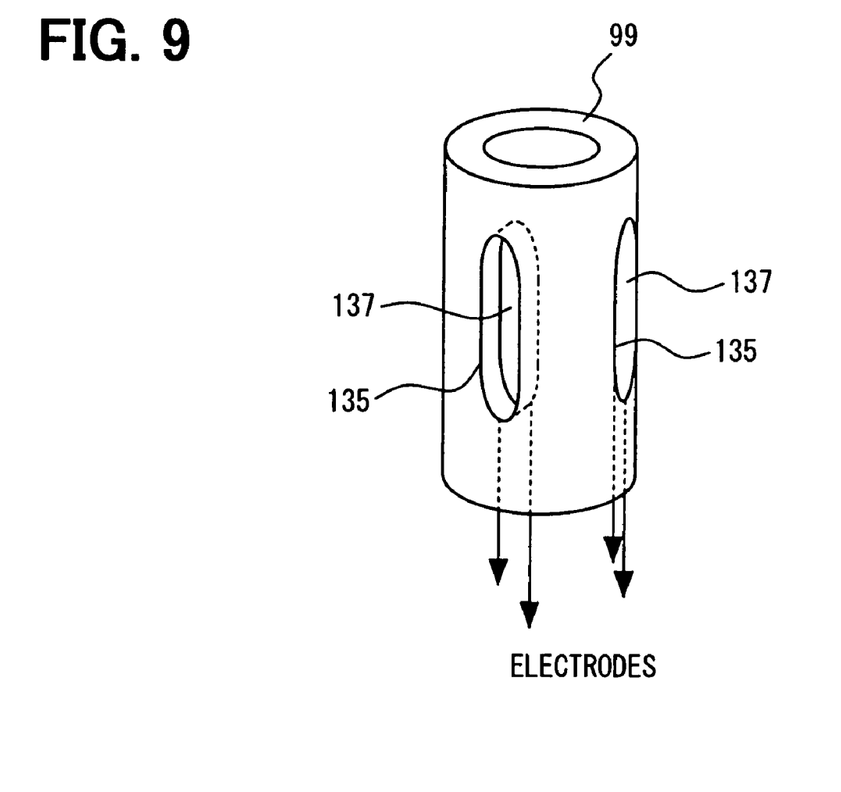
FIG. 9 is a perspective view showing a construction of a PTC heater.

A PTC heater 133 in FIG. 8 is attached to the top surface 127 of the stopper 125. Atop surface of the PTC heater 133 contacts the oil constituting the hydrodynamic bearing. As shown in FIG. 9, a recess 135 is formed on part of the outside peripheral surface of the rotation axis 99. The PTC heater 137 is attached to the recess 135. The depth of the recess 135 equals the thickness of the PTC heater 137. When the PTC heater 137 is attached to the recess 135, no projection or dent occurs on the outside peripheral surface of the rotation axis 99. The PTC heater 137 contacts the oil constituting the hydrodynamic bearing. The PTC heaters 133 and 137 are connected to an electrode (not shown). The microcomputer 71 controls power on/off of these heaters.

Figure 10:
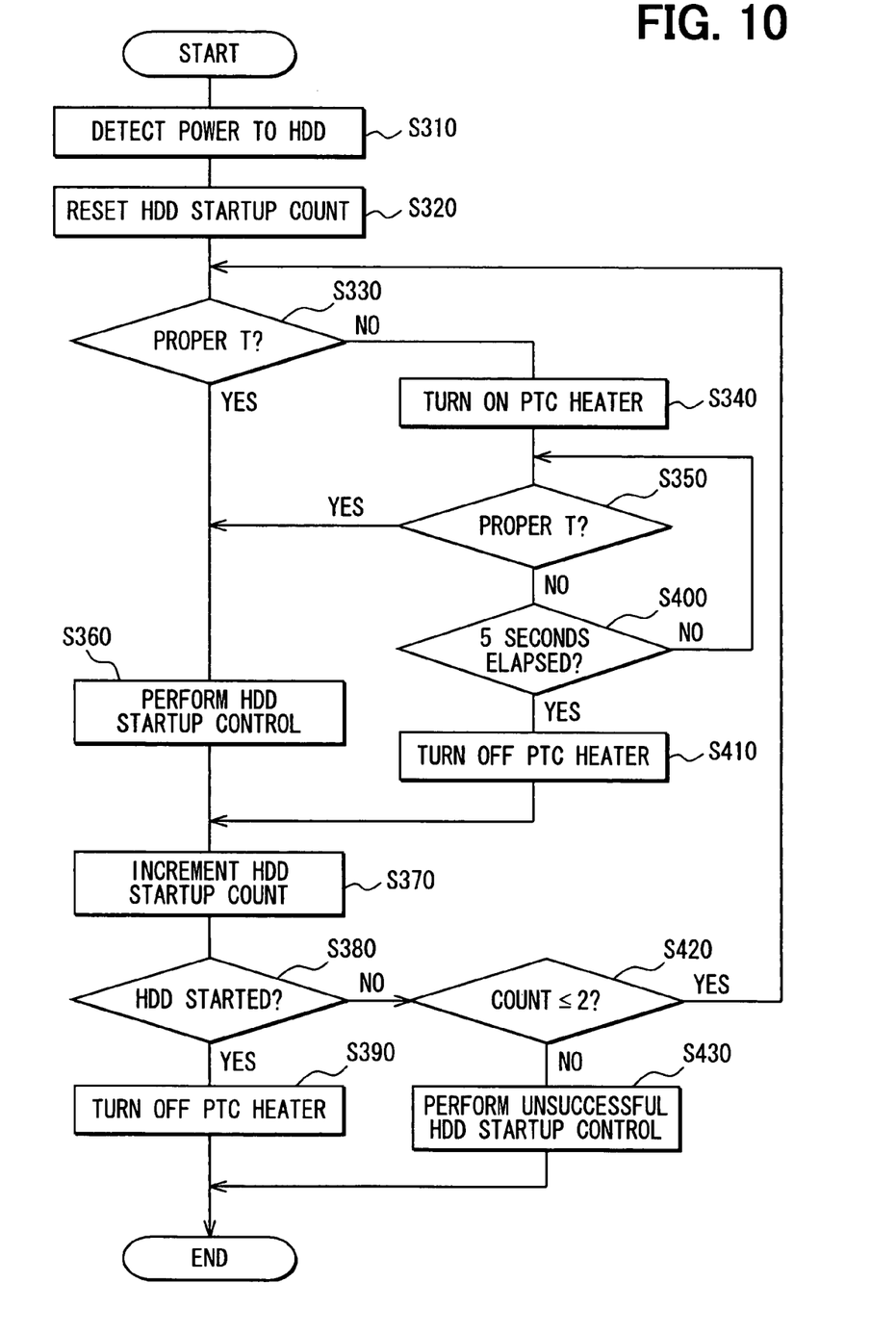
FIG. 10 is a flowchart showing a control process performed by a microcomputer when the HDD starts.

The HDD 5 measures the temperature of the oil constituting the hydrodynamic bearing. The sleeve 119 contains an oil temperature sensor 138 that outputs a signal indicating the measured temperature to the microcomputer 71.

b) With reference to a flowchart in FIG. 10, the following describes a control process performed by the microcomputer 71 of the HDD 5 when the in-vehicle navigation system 1 starts. According to the second embodiment, the microcomputer 71 of the HDD 5, not the control circuit 9 for the entire in-vehicle navigation system 1, controls the startup.

At Step 310, the process detects that electric power starts to be supplied to the HDD 5.

At Step 320, the process resets the HDD startup count to 0.

At Step 330, the process determines whether or not the oil constituting the hydrodynamic bearing has a temperature indicating a proper viscosity i.e., a temperature predetermined for the oil characteristic. When the determination at Step 330 results in NO, the process proceeds to Step 340. When the determination at Step 330 results in YES, the process proceeds to Step 360.

At Step 340, the process turns on the PTC heaters 133 and 137.

At Step 350, the process determines whether or not the oil constituting the hydrodynamic bearing has a temperature indicating a proper viscosity. When the determination at Step 350 results in YES, the process proceeds to Step 360. When the determination at Step 350 results in NO, the process proceeds to Step 400.

At Step 360, the process performs HDD startup control. This startup control is normally performed for the HDD 5 including revolution of the SPM 39.

At Step 370, the process increments the HDD startup count by 1.

At Step 380, the process determines whether or not the HDD 5 has started successfully. When the determination at Step 380 results in YES, the process proceeds to Step 390. When the determination at Step 380 results in NO, the process proceeds to Step 420.

At Step 390, the process turns off the PTC heaters 133 and 137.

When the determination at Step 350 results in NO, the process proceeds to Step 400 and determines whether or not five seconds have passed after the PTC heaters 133 and 137 are turned on at Step 340. When the determination at Step 400 results in YES, the process proceeds to Step 410 to turn off the PTC heaters 133 and 137 and proceeds to Step 370. When the determination at Step 400 results in NO, the process returns to Step 350.

When the determination at Step 380 results in NO, the process proceeds to Step 420 to determine whether or not the HDD startup count is smaller than or equal to 2. When the determination at Step 420 results in YES, the process proceeds to Step 330. When the determination at Step 420 results in NO, the process proceeds to Step 430.

At Step 430, the process performs the unsuccessful HDD startup control.

c) The in-vehicle navigation system 1 according to the second embodiment further provides the following effects as well as those available from the first embodiment.

(i) The HDD 5 does not perform the HDD startup control when the oil maintains a specified temperature (lower than or equal to reference temperature T1). That is, the process does not proceed to the HDD startup control at Step 360 when the determination at Step 350 results in NO in FIG. 10. This makes it possible to prevent the HDD 5 from being forcibly started and damaged while the hydrodynamic bearing maintains a low temperature.

(ii) The HDD 5 uses a hydrodynamic bearing for a slide section including the rotation axis 99, the sleeve 119, the hub 101, and the stopper 125. The hydrodynamic bearing is structured to support members using oil and enables a very smooth slide. Generally, however, the oil viscosity largely depends on temperature. A low temperature increases the oil viscosity and a slide resistance.

The HDD 5 uses the PTC heaters 133 and 137 to control the temperature of the slide section. Even when an oil temperature is low initially, it is possible to fast increase the oil temperature and start the HDD 5 in a short period of time.

(iii) The PTC heaters 133 and 137 have an accident control function, making the temperature control easy. The use of a heater other than the PTC heater makes it difficult to manage the temperature of the slide section. There is a need for providing a temperature determination step while the HDD startup control (Step 360) is performed. By contrast, the HDD 5 according to the second embodiment does not need such additional step. As a result, the microcomputer 71 is subject to a decreased load. The microcomputer 71 can exclusively process data and speed up the HDD 5.

3. Modifications

It is to be distinctly understood that the present invention is not limited to the above-mentioned embodiments but may be otherwise variously embodied within the spirit and scope of the invention.

In the second embodiment for example, a temperature sensor may be attached to the PTC heaters 133 and 137 for more accurately controlling the temperature of the slide section. In addition, the board may detect a change in the power supply current supplied to the PTC heaters 133 and 137. A result may be used for the temperature control.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

4. Features

Features of the subject matter described herein are set out in the following clauses.

(a) As a first feature, in a storage apparatus, a temperature detection unit detects a temperature in a slide section while a storage medium is rotatively driven. When the temperature is lower than or equal to specified reference temperature T1, a control unit turns on a PTC heater to heat the slide section.

For example, the slide section initially may show a low temperature when the storage apparatus starts. In such case, the PTC heater heats the slide section, especially a lubricant agent such as bearing grease and hydrodynamic bearing oil used for the slide section. A slide resistance decreases, making it possible to smoothly start the storage apparatus.

The PTC heater is characterized by self-temperature controllability of heating with a high power at a low temperature and automatically lowering the power at an increased temperature. The PTC heater further features a thin profile and a small heat quantity and excels in "quick heat" of increasing a temperature immediately after starting using the heater. Even when the slide section initially has a low temperature, the storage apparatus can increase the temperature of the slide section in a very short period of time and smoothly start the storage apparatus.

The PTC heater is characterized to partially heat only a low-temperature portion. The heater consumes a very small power compared to a conventional heater that heats an entire portion when the temperature decreases locally. Therefore, the storage apparatus can also consume a very small power.

The PTC heater causes a small temperature variation and excels in "uniformity" of the temperature. The heater can uniformly heat the slide section without heating it too much or little.

The storage apparatus is widely applicable to apparatuses having rotative driving mechanism such as a hard disk drive, an optical disk drive, and a DVD drive. The storage medium is applicable to those used for these drives.

The drive unit is widely applicable to means capable of rotatively driving the storage medium such as a spindle motor (SPM), for example.

The slide section is applicable to a bearing structure in the SPM, for example. Specifically, the slide section includes a bearing for surrounding a rotation axis of the SPM and a slide surface between the rotation axis and the bearing in the SPM.

The temperature detection unit may directly measure a temperature of the slide section or a circumference thereof such as an ambient temperature inside or outside the storage apparatus, for example.

The control unit is applicable to an ordinary computer, for example.

The PTC heater may be attached to any position where the slide section can be heated. The PTC heater may be attached to such a position as to directly contact the slide section or indirectly heat the slide section via another member. The former attachment position includes a surface of the rotation axis of the SPM or a surface of such a member as the bearing and a sleeve for supporting the rotation axis. The latter attachment position includes the one contacting an SPM case.

The storage apparatus can smoothly start when the temperature is higher than or equal to the reference temperature T1. An actual temperature can be specified in accordance with slide section characteristics such as lubricant agent and oil types.

(i) As an optional characteristic of the first feature, during startup, the storage apparatus may turn on a PTC heater when a temperature detected by a temperature detection unit is lower than or equal to the reference temperature T1. The storage apparatus can smoothly start even when a slide section initially indicates a low temperature during startup.

(ii) As an optional characteristic of the first feature, the storage apparatus may turn off a PTC heater when a specified time period elapses after the PTC heater turns on. The PTC heater does not remain turned on when a temperature of a slide section does not rise due to an anomaly. As a result, it is possible to prevent the temperature from excessively increasing in the slide section and lower power consumption.

(iii) As an optional characteristic of the first feature, the storage apparatus may inhibit rotative driving of a drive unit when a temperature detection unit detects a temperature lower than or equal to reference temperature T1. It is therefore possible to prevent a case of forcibly starting a slide section kept at a low temperature and damaging the storage apparatus.

(iv) As an optional characteristic of the first feature, in the storage apparatus, a slide section may include a hydrodynamic bearing. The hydrodynamic bearing is structured to support a sliding member via oil, as one type of fluid for lubrication, and enables a very smooth slide. Generally, the oil viscosity largely depends on a temperature. When the temperature varies approximately 50° C., the viscosity varies by one digit. The oil viscosity increases at a low temperature, thus increasing a slide resistance. By contrast, the PTC heater is used to control a temperature of the slide section. Even when an oil temperature is low initially, it is possible to fast increase the oil temperature and start the storage apparatus in a short period of time.

(v) As an optional characteristic of the first feature, the drive unit may include a rotation axis, a cylindrical bearing surrounding the rotation axis, and a support member having a cylindrical inside surface and surrounding the bearing. The rotation axis and the cylindrical bearing may be included in the slide section. The PTC heater may be disposed in one of the bearing and the rotation axis to face the other of the bearing and the rotation axis.

Further, in this configuration, the cylindrical bearing may include a first cylindrical bearing part and a second cylindrical bearing part, the first and second cylindrical bearing parts sandwiching therebetween the PTC heater being cylindrical. The first cylindrical bearing part, the PTC heater, and the second cylindrical bearing part may have approximately identical inside and outside diameters and integratively surround the rotation axis.

Further, the rotation axis may have a cutout formed on an outside peripheral surface of the rotation axis along a circumferential direction. The PTC heater may be band-shaped and have an outside diameter approximately identical to an outside diameter of the rotation axis. The PTC heater may be wound around the cutout and face the bearing.

(vi) As an optional characteristic of the first feature, the drive unit may include a rotation axis having a cylindrical outside peripheral surface portion, and a support member having a cylindrical inside surface portion, the cylindrical inside surface portion of the support member surrounding the cylindrical outside peripheral surface portion of the rotation axis. The rotation axis may have a bottom stopper, which has a top surface facing a bottom surface of the support member and rotates integratively with the rotation axis. The outside peripheral surface portion of the rotation axis slides on the inside surface portion of the support member, while the top surface of the bottom stopper slides on the bottom surface of the support member. Fluid may be provided to fill between sliding surfaces of the rotation axis, the bottom stopper, and the support member to thereby provide a hydrodynamic bearing. The PTC heater may be disposed in at least one of the rotation axis, the bottom stopper, and the support member to contact the fluid constituting the hydrodynamic bearing.

Further, in the above configuration, the PTC heater may be attached to the top surface of the bottom stopper to contact the fluid constituting the hydrodynamic bearing.

Further, a recess may be formed on part of the cylindrical outside peripheral surface portion of the rotation axis. The PTC heater may be attached to the recess to hardly cause projection or dent on the outside peripheral surface portion of the rotation axis and contact the fluid constituting the hydrodynamic bearing.

Yet further, on the sliding surfaces of the rotation axis, the bottom stopper, and the support member, a herringbone groove structure may be formed.

(b) As a second feature, an in-vehicle navigation system may be provided to include the storage apparatus of the first feature, or the storage apparatus of the first feature may be included in an in-vehicle navigation system. The system can start in a short period of time at a low temperature.

(c) As a third feature, a method for controlling a temperature of a storage apparatus is provided. The method comprises: rotatively driving a storage medium; detecting a temperature in a slide section, which slides while the storage medium is rotatively driven; performing a determination as to whether or not the detected temperature is lower than or equal to a specified reference temperature; and turning on a PTC (Positive Temperature Coefficient) heater to heat the slide section when the determination is affirmed.

It will be obvious to those skilled in the art that various changes may be made in the above-described embodiments of the present invention. However, the scope of the present invention should be determined by the following claims.

What is claimed is:

1. A storage apparatus comprising:
a storage medium configured to store data;

a drive unit configured to rotatively drive the storage medium, the drive unit including a rotation axis around which the storage medium is rotatively driven;

a bearing configured to surround the rotation axis;

a head unit configured to record data to the driven storage medium and reproduce the recorded data;

a temperature detection unit configured to detect a temperature in a slide section, which slides while the storage medium is rotatively driven, the slide section including the rotation axis and the bearing;

a heater configured to contact at least both the rotation axis and the bearing; and a control unit configured to turn on the heater to heat the slide section when the detected temperature is lower than or equal to a specified reference temperature.

2. The storage apparatus of claim 1, wherein the heater is turned on when a temperature detected by the temperature detection unit is lower than or equal to the reference temperature.

3. The storage apparatus of claim 1, wherein the heater is turned off when a specified time period elapses after the heater turns on.

4. The storage apparatus of claim 1, wherein the control unit inhibits rotative driving of the drive unit when the temperature detection unit detects a temperature lower than or equal to the reference temperature.

5. The storage apparatus of claim 1, wherein the bearing includes a hydrodynamic bearing.

6. The storage apparatus of claim 1, wherein:
the drive unit includes (i) the rotation axis, (ii) the bearing, being a cylindrical bearing surrounding the rotation axis, and (iii) a support member having a cylindrical inside surface and surrounding the cylindrical bearing;
the rotation axis and the cylindrical bearing are included in the slide section; and
the heater is disposed in one of the bearing and the rotation axis to face the other of the bearing and the rotation axis.

7. The storage apparatus of claim 6, wherein:
the cylindrical bearing includes a first cylindrical bearing part and a second cylindrical bearing part, the first and second cylindrical bearing parts sandwiching therebetween the heater being cylindrical; and
the first cylindrical bearing part, the heater, and the second cylindrical bearing part have approximately identical inside and outside diameters and integratively surround the rotation axis.

8. The storage apparatus of claim 6, wherein:
the rotation axis has a cutout formed on an outside peripheral surface of the rotation axis along a circumferential direction;
the heater is band-shaped and has an outside diameter approximately identical to an outside diameter of the rotation axis; and
the heater is wound around the cutout and faces the bearing.

9. The storage apparatus of claim 1, wherein:
the drive unit includes (i) the rotation axis having a cylindrical outside peripheral surface portion, and (ii) a support member having a cylindrical inside surface portion, the cylindrical inside surface portion of the support member surrounding the cylindrical outside peripheral surface portion of the rotation axis;
the rotation axis has a bottom stopper, which has a top surface facing a bottom surface of the support member and rotates integratively with the rotation axis;
the outside peripheral surface portion of the rotation axis slides on the inside surface portion of the support member, while the top surface of the bottom stopper slides on the bottom surface of the support member;
fluid is provided to fill between sliding surfaces of the rotation axis, the bottom stopper, and the support member to thereby provide as a hydrodynamic bearing the bearing surrounding the cylindrical outside peripheral surface portion of the rotation axis; and
the heater is disposed in at least one of the rotation axis, the bottom stopper, and the support member to contact the fluid constituting the hydrodynamic bearing.

10. The storage apparatus of claim 9, wherein the heater is attached to the top surface of the bottom stopper to contact the fluid constituting the hydrodynamic bearing.

11. The storage apparatus of claim 9, wherein:
a recess is formed on part of the cylindrical outside peripheral surface portion of the rotation axis; and
the heater is attached to the recess to hardly cause projection or dent on the outside peripheral surface portion of the rotation axis and contacts the fluid constituting the hydrodynamic bearing.

12. The storage apparatus of claim 9, wherein:
on the sliding surfaces of the rotation axis, the bottom stopper, and the support member, a herringbone groove structure is formed.

13. The storage apparatus of claim 1, wherein:
the heater is configured to be sandwiched between the rotation axis and the bearing surrounding the rotation axis.

14. The storage apparatus of claim 1, wherein:
the heater includes a positive temperature coefficient (PTC) heater.

15. The storage apparatus of claim 9, wherein:
the slide section includes a first portion that rotates along with the storage medium being rotated, and a second portion that remains fixed regardless of the storage medium being rotated; and
The heater attached to contact the slide section includes a first heater element attached to the first portion, and a second heater element attached to the second portion.

16. The storage apparatus of claim 9, wherein:
At least two recesses are formed to pass through a cylindrical wall of the rotation axis, the two recesses being parallel with each other in an axial direction of the rotation axis; and
the heater includes at least two heater elements respectively attached to the two recesses.

17. The storage apparatus of claim 1, wherein:
the slide section includes a portion that rotates along with the storage medium; and
the heater attached to contact the slide section includes a heater element configured to attach to a circumferential surface of the portion that rotates along with the storage medium.

18. A method for heating a storage apparatus, the method comprising:
rotatively driving a storage medium;
detecting a temperature in a slide section while the storage medium is rotatively driven, the slide section including at least a rotation axis and a bearing surrounding the rotation axis;
performing a determination as to whether or not the detected temperature is lower than or equal to a specified reference temperature; and turning on a heater, which is arranged to make contact with the both the rotation axis and the bearing in the slide section, to heat the slide section when the determination is affirmed.

19. A navigation apparatus comprising:
the storage apparatus of claim 1.

* * * * *